United States Patent [19]

Brorein et al.

[11] 4,170,510
[45] Oct. 9, 1979

[54] APPARATUS AND METHOD FOR ASSEMBLING COMMUNICATIONS CABLE CONTAINING FIBER OPTIC CONDUCTORS

[75] Inventors: William J. Brorein, Whippany, N.J.; Robert Tattanelli, Brooklyn, N.Y.

[73] Assignee: General Cable Corporation, Greenwich, Conn.

[21] Appl. No.: 871,471

[22] Filed: Jan. 30, 1978

[51] Int. Cl.² .............................................. B32B 31/00
[52] U.S. Cl. .................................. 156/432; 156/443; 156/510
[58] Field of Search .......................... 350/96.10, 96.23; 156/425, 428–432, 250, 510, 51–56; 174/28, 116, 113 AS; 428/36

[56] References Cited

U.S. PATENT DOCUMENTS

| | | | |
|---|---|---|---|
| 2,501,457 | 3/1950 | Thelin | 174/116 UX |
| 3,498,286 | 3/1970 | Dolanyi et al. | 350/96.23 X |
| 3,688,016 | 8/1972 | Spade | 174/28 X |
| 4,011,118 | 3/1977 | Geominy | 156/51 |

FOREIGN PATENT DOCUMENTS 2507583  2/1976  Fed. Rep. of Germany ........ 350/96.23

Primary Examiner—David A. Simmons
Attorney, Agent, or Firm—Roy C. Hopgood; John M. Calimafde; Charles W. Neill

[57] ABSTRACT

This invention is an improved apparatus and method for making fiber optic communication cables by cutting accurate helical grooves in a layer of insulation surrounding the surface of a strength member, and inserting the fiberglass conductors into the grooves with fillers and spacers around and between the glass conductors to protect them from damage. Helically wrapped binders and heat barrier tapes may be wrapped over the assembly with any additional binder threads or tapes as may be necessary to hold the heat barrier in place.

21 Claims, 7 Drawing Figures

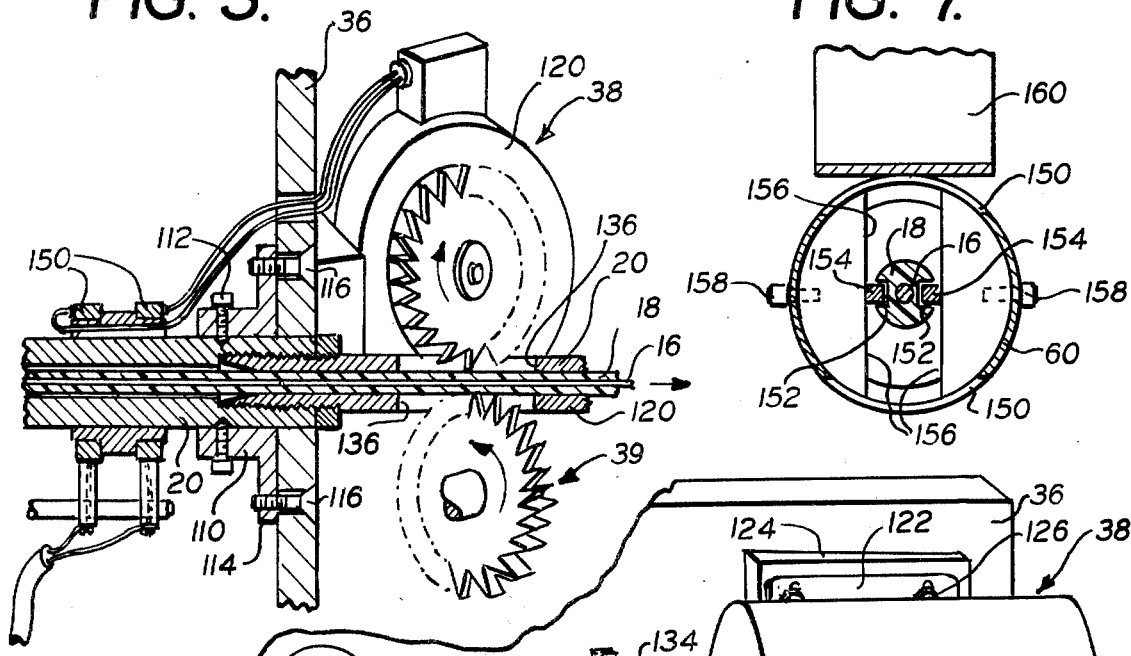
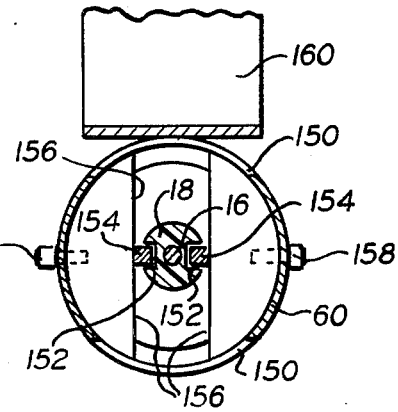
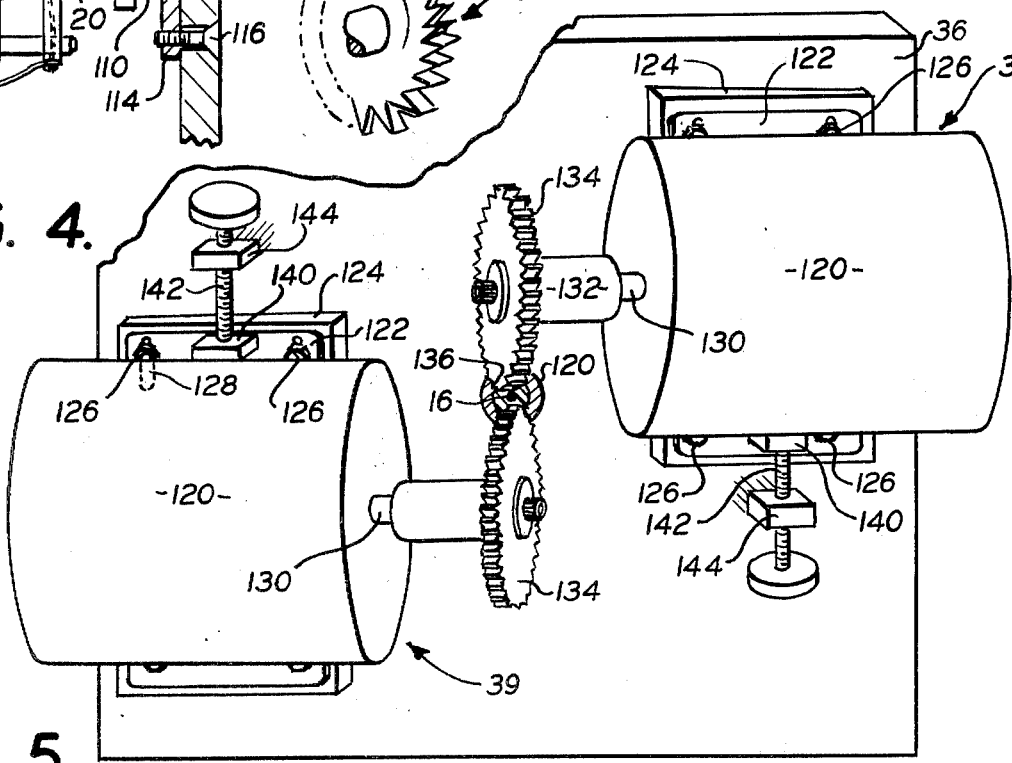
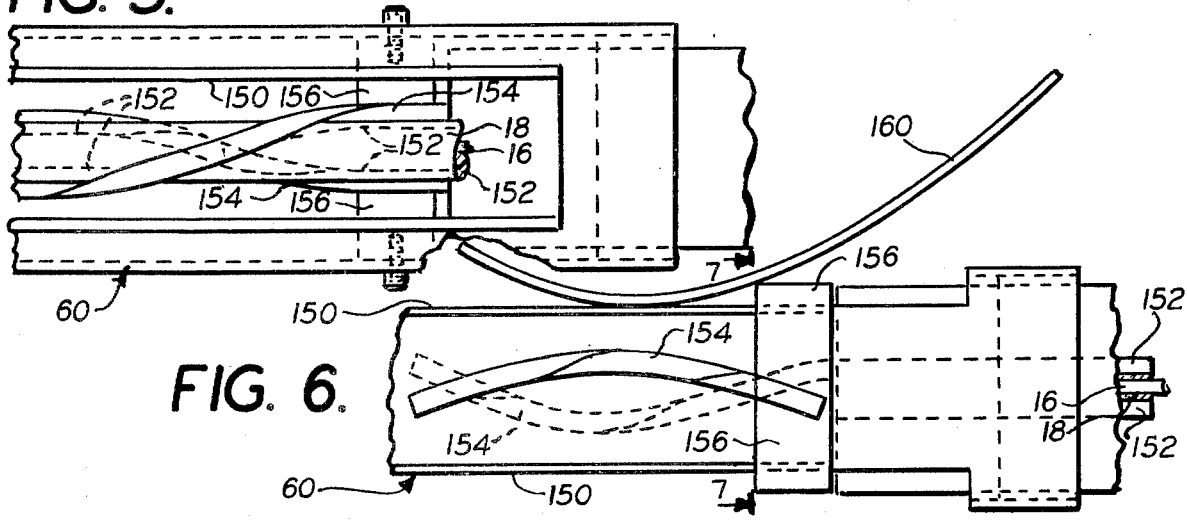

APPARATUS AND METHOD FOR ASSEMBLING COMMUNICATIONS CABLE CONTAINING FIBER OPTIC CONDUCTORS

RELATED PATENT APPLICATION

The apparatus and method of this application are intended especially for making the fiber optic cable disclosed in the patent application Ser. No. 756,979, filed Jan. 5, 1977, now U.S. Pat. No. 4,110,001.

BACKGROUND AND SUMMARY OF THE INVENTION

In the field of communication cables, there have been recent advances whch make use of fiber optic conductors to provide wide band transmission channels. These cables, because of the delicate nature of the fiberglass conductors, were previously assembled by wrapping the glass strand over a strength member core and placing fillers or spacers around and between the glass conductors in an attempt to protect them from damage.

Strength member cores with extruded grooves or splines have been tried with only fair success, because of the variability of the pitch of the helix resulting from the difficulty of accurately forming such grooves in extruded plastic materials, and in particular foamed plastic materials.

This invention provides apparatus and method for forming precise helical grooves in the plastic layer of insulation which covers a strength member, and simultaneously placing the fiber optic and electrical conductors into their assigned grooves in the making of the fiber optic cable.

In apparatus for assembling a communication cable containing both fiber optic and electrical conductors, there is a payoff unit for the covered strength member, a rotating driven cutter support plate on which are mounted one or more self-driven cutter heads which are powered by electricity furnished through slip rings, a guide tube for the core into and out of the cutter head, payoff members for the fiber optic and electrical conductors which are carried on supply reels mounted on the driven rotating guide tube. The apparatus also includes driven binder heads, a driven capstan to pull the cable as it is being formed through the various operations, payoff members to hold the insulating tapes that are folded over the core with the necessary forming and guide mechanisms, the driven rotating binder heads to hold the insulating tapes in place and a driven take-up unit. All units of this apparatus are carefully synchronized by electrical and mechanical means so that the grooves are cut to an exact, predetermined pitch and depth, and the conductors are placed precisely into their assigned grooves.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 3 is an enlarged view, partly in section and partly broken away, of the grooving station;

FIG. 4 is a diagrammatic front view of the grooving station and illustrating the way in which the cutters are adjusted to control the depth of the helical groove;

FIG. 5 is a fragmentary top view of a portion of the conductor feed station;

FIG. 6 is a side elevation of the apparatus shown in FIG. 5 with the optic tape guide in position for guiding the optic fiber tape into the helical groove in the strength member; and FIG. 7 is a sectional view taken on the line 7—7 of FIG. 6.

DESCRIPTION OF PREFERRED EMBODIMENT

Figure 1:
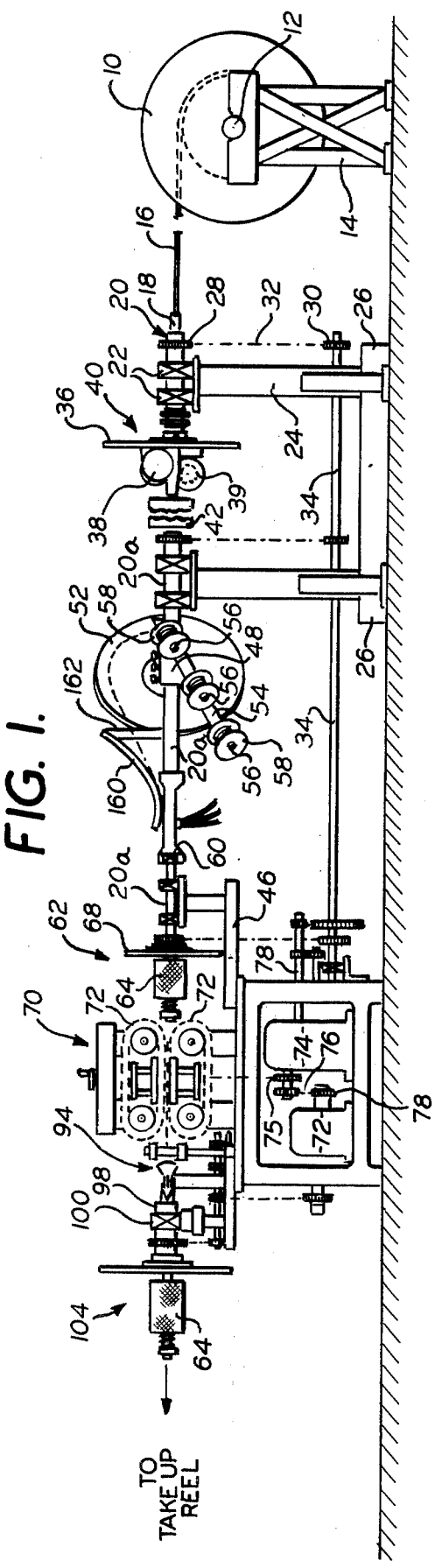
FIG. 1 is a diagrammatic elevation of apparatus for making fiber optic cables in accordance with this invention.

FIG. 1 shows the preferred apparatus for making fiber optic cables. A strength member, such as a steel cable, is unreeled from a spool 10 supported by an axle 12 from a frame 14. The strength member is indicated by the reference character 16. The strength member is coated with a layer of softer material 18, such as plastic, and this plastic coating 18 (FIG. 3) is firmly adhered to the strength member 16 by extruding it over the strength member 16, or in any other suitable way. It is preferable to have the plastic coating 18 concentric with the axis of the strength member 16.

Referring again to FIG. 1, the strength member 16 unwinds from the drum 10 and passes into the open end of a guide 20.

This guide 20 is preferably a cylindrical tube having an inside diameter substantially equal to the outside diameter of the coating 18 on the strength member 16. Because of the integral connection of the coating 18 to the strength member 16, the coating will be considered a part of the strength member in the further description of the apparatus. The guide 20 rotates in bearings 22 located on top of a supporting pedestal 24 attached to a base 26 on the floor of the shop or other location where the apparatus is located.

Figure 2:
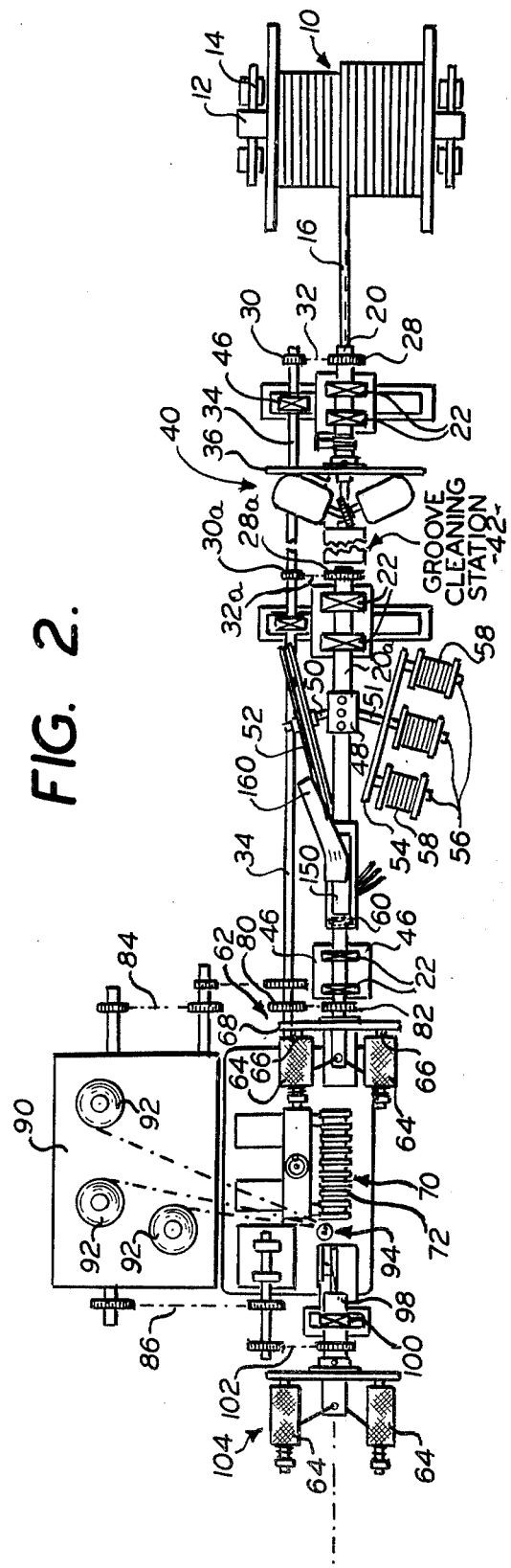
FIG. 2 is a top plan view of the apparatus shown in FIG. 1.

The strength member 16 moves longitudinally through the successive stations of the apparatus shown in FIGS. 1 and 2, but it does not rotate. The guide 20 rotates about the axis of the strength member 16 in substantial contact with the outside of the coating on the strength member and thus serves to guide the strength member along its axis which substantially coincides with the axis of rotation of the guide 20. A sprocket 28 secured to the guide 20 is driven from another sprocket wheel 30 through a chain 32 attached to a driveshaft 34. Equivalent motion transmitting means can be used, such as direct gearing.

A head 36 is secured to the outside of the guide 20 on the side of the bearings 22 remote from the sprocket 28. This plate 36 supports cutters, indicated generally by the reference characters 38 and 39. These cutters will be more fully explained in connection with FIGS. 3 and 4.

The cutters 38 rotate as a unit with the plate 36, and they cut grooves in the plastic coating of the strength member 16. Since the coating is moving with longitudinal motion only, and the cutters 38 and 39 are rotating about the axis of the strength member, the grooves that are formed by the cutters are helical grooves. The pitch of the helices depends upon the ratio of the longitudinal speed of the strength member and the angular speed of the plate 36 that carries the cutters in orbital paths around the strength member.

The plate 36 and the cutters 38 and 39 provide a grooving station 40 for the apparatus. Since some chips are left in the groove by the cutting operation, a groove cleaning station 42 is located immediately beyond the grooving station 40 in the direction in which the strength member 16 travels through the apparatus. The groove cleaning station 42 is representative of apparatus for removing chips and other material from the grooves formed by the cutters, and it may use brushes, air blasts or any other conventional cleaning equipment; and particular apparatus for cleaning the grooves forming no part of the present invention.

The guide 20 terminates at the groove cleaning station but there is another guide 20a into which the strength member 16 passes immediately after leaving the guide 20; and this second guide 20a is of similar inside diameter to the guide 20 and is supported by bearings 22 similar to those for the guide 20, and these additional bearings 22 are supported in the same way as the first bearings, so that the guides 20 and 20a are in alignment with one another.

The guide 20a is rotated in its bearings 22 by a sprocket wheel 28a driven from a drive sprocket 30a through a sprocket chain 32a on the same driveshaft 34 with the first drive sprocket 30.

The guide 20a is supported at its downstream end by other bearings 22 carried by a structure 46 which is rigidly connected with adjacent structure supported from the floor of the shop. A frame 48 is secured to the outside of the guide 20a, and this frame 48 has axles 50 and 51 projecting from it. The axle 50 supports a reel 52 which can be used in several ways, as will be more fully described. The axle 51 supports a frame 54 from which spindles 56 extend; and there is a spool 58 on each of the spindles 56.

Along a part of the length of the guide 20a, there is a sleeve 60 which rotates as a unit with the guide 20a and which has openings in it for access to the helical grooves in the strength member. This sleeve 60 and the reel 52, spools 58 and associated structure provide the conductor feed-in station of the apparatus. This part of the apparatus can be used in different ways.

For example, fiber optic conductors can be unwound from the spools 58 and fed through an opening in the sleeve 60 into a groove in the coating of the strength member; and a protective tape can be supplied from the reel 52 under or over the fiber optic conductors with adhesive on the tape for contact with the fiber optic conductors to prevent them from moving laterally toward and from one another after they are in the groove. Another way in which the conductor feed-in station can be used is to have the fiber optic conductors secured to a tape wound on the reel 52 and to feed this tape into one of the helical grooves of the coating on the strength element while metallic conductors wound on the spools 58 and insulated from one another, are fed into the other helical groove in the coating of the strength member. These are examples of different ways in which the conductor feed-in station can be operated, and other modifications can be made, depending upon the desired construction of the cable made on the apparatus of this invention. The conductor feed-in station will be described more fully in connection with FIGS. 5, 6 and 7.

The sleeve 60 has an internal bearing which receives the shaft on which a binding head 68 is supported, and this shaft is driven by a sprocket 82 independent of any rotation of the sleeve 60. The binding head 68 may be driven in either direction. Preferably, it turns in a direction opposite to that of the cutting head 36, and at a higher speed for some cable constructions.

At the downstream end of the guide 20a, there is an inner binder station 62 which has tubes of binder thread 64 supported by spindles 66 from a rotating frame 68 that may be rotated as a unit in either a clockwise or counterclockwise direction from chain and sprocket drive 80 and 82 for wrapping binding over the helical grooves in the coating on the strength element to secure the fiber optic conductors, tapes, and metal conductors or other structure in place of the grooves into which such structure has been inserted at the conductor feed-in station.

The longitudinal movement is imparted to the coated strength member 16 at a puller station 70 where endless belts 72 contact with the upper and lower surfaces of the coated strength member to maintain it in continuous and uniform longitudinal motion. Such pullers are well known in the cable art and no further illustration or explanation of it is necessary for a complete understanding of the present invention. It is important, however, that the puller station 70 move the coated strength member through the apparatus at a speed which is coordinated with the speed of operation of the elements that rotate about the axis of the strength member at the other stations and this result is preferably obtained by having the same motor as the other elements of this apparatus.

A single drive motor 72, preferably an electric motor, is shown in FIG. 1 connected with a power transmission unit 74 by a chain and sprocket connection 76. One chain and sprocket connection 75 supplies power to the puller station 70; and a driven shaft 78 of the transmission 74 drives the power shaft 34 through multiple chain and sprocket connections shown collectively 80 through 82 (FIGS. 1 and 2).

Referring to FIG. 2, the chain and sprocket connection 82 transmits motion through other chain and sprocket drives 84 and 86 on opposite sides of an insulation tape payoff 90 having tape pads 92 from which tape is supplied to a taping station 94. Beyond the taping station 94, the strength element with the tape applied to it at the station 94 is passed through another guide 98 which is rotated in a bearing 100 by a chain and sprocket drive 102 which is, in turn, driven from the chain and sprocket drive 86. An outer binder station 104 is attached to the guide 98 and rotates with it in the same manner that the inner binding station 62 cooperates with the guide 20a. The binding station 104 has tubes of binder tape 64 which are applied over the outside of the tapes from the tape payout 90. After having the outer binding tape applied to it at the station 104, the strength member and the structure applied to it is discharged from the guide 98 and is wound on spools for storage or passed on to other cable-making equipment.

FIG. 3 shows the grooving station 40 on a larger scale. For clearer illustration of the operation of the cutters, the apparatus is looked at from the opposite side to that of the view in FIG. 1. The strength member with its coating 18 is shown moving to the right, as indicated by the arrow, and the guide 20 is shown supported from the plate 36 and connected to the guide 20 by a flanged sleeve 110 which fits snugly over the outside of the guide 20 and is held against angular movement on the guide 20 by set screws 112. A flange 114 is integrally connected with the plate 34 by screws 116, so that the plate 36 rotates as a unit with the guide 20.

The cutters 38 and 39 each include a motor 120 (FIG. 4) and each motor has a conventional base 122 bolted to metal pads 124 which are rigidly secured to the plate 36, and stud bolts 126 extend from the pad 124 through slots 128 in the base 122 of each motor. The motors 120 are connected to the plate 136 by placing the motor base 128 over the stud bolts 126 and placing nuts on the threads of the stud bolts 126 so as to secure the motor bases to the pads 124. These motor mount pads 124 are wedge-shaped to provide the correct angle between the cutter and strength member for the particular pitch of helix to be cut in the strength member insulation. The cutters 38 and 39 turn in a direction to oppose the motion of the strength member 16. This is important in obtaining smooth, jam-free operation.

Each of the motors 120 has an armature shaft 130 to which is rigidly secured a hub 132 of a cutter wheel 134. The cutter wheels 134 extend through slots 136 (FIG. 3) in the top and bottom of the guide 20. The depth of the cut made by each of the cutter wheels 134 is controlled by moving the motor and its attached cutter wheel up and down on the plate 36 so as to shift the cutter wheels toward and from the axis of the strength element 16. FIG. 4 shows the construction by which such adjustments are made. Each motor base 122 is moved to shift its slots 128 along the stud bolts 126 to the approximate location for the desired depth of cut and preferably to a location that will make a cut slightly deeper than desired. The nuts on the stud bolts 126 are then initially tightened but with the tightness limited so that the base 122 can be moved if sufficient force is applied. Such force can be applied by exerting pressure against a block 140 which is an integral part of the motor base 122. A screw 142 threads through a fixed block 144 on the plate 36, and the rotation of the screw 142 in one direction exerts a high pressure against the block 140 so that the motor base 122 is moved downward or upward in the direction to reduce the depth of the groove which will be cut by the cutter wheel 134 of the particular motor that is being adjusted.

The depth of groove is then tested by operating the cutter wheel, and if the depth is still somewhat greater than desired, the screw 142 is turned further until the ideal depth of groove is obtained. The nuts on the stud bolts 126 are then tightened to prevent any further movement of the motor when the apparatus is in operation. Set screws can be used on the adjusting screws 142, if necessary as a safety precaution against any vibration causing the motor to change its position to cut a deeper groove.

FIGS. 5, 6 and 7 are enlarged views of the region of the sleeve 60 which has slots 150 through which the fiber optic conductors, tape and/or metal conductors enter the sleeve 60 on their way to the helical grooves 152, best shown in FIGS. 6 and 7.

There are core helix guides 154 which extend into the helical grooves 152 to serve as groove stabilizers. These core helix guides 154 are attached to supports 156 which are constructed with parallel faces that confront one another just beyond the guide tube 20a, and these supports 156 have curved back surfaces that contact with the inside surface of the sleeve 60 and that are held firmly in such contact by screws 158 which pass through the sides of the sleeve 60 and thread into the supports 156.

These core helix guides 154 are shaped to follow the helical grooves 152 and are so located to insure that the grooves of the coated strength member are at the correct angle to receive the elements from the reel 52 and frame 54 which are fed into the openings 150 which are on opposite sides of the sleeve which rotates as a unit with the guide tube 20a and the frame 48 that rotates as a unit with the guide tube. FIG. 5 is a top plan view looking through the opening 150 when the opening is at the top of the sleeve section 60. The strength member 16 and its coating 18 are broken away at the right-hand ends of the core helix guides 154 in FIG. 5 for clearer illustration.

FIG. 6 shows the core helix guides in side view without attempting to illustrate the coated strength member. The one shown in solid lines is the one which connects with the upper support 156 in FIG. 5, and the one shown in dotted lines is the one which connects with the lower support 156 in FIG. 5.

FIG. 7 is a sectional view taken on the line 7—7 at the surface of the supports 156.

There is a guide 160 on the side of the apparatus at which the reel 52 is located. This guide 160 is used for controlling the direction of movement of fiber optic tape when a tape to which the fiber optic conductors are secured is used with the apparatus. This guide 160 is connected with the frame 148 so as to rotate with the guide 20a and with the frame 48, and to obtain this rotation it is connected with the guide 20a by a support 162 shown in FIG. 1 but omitted in FIG. 2 for clearer illustration.

The preferred embodiment of the invention has been illustrated and described, but changes and modifications can be made and some features can be used in different combinations without departing from the invention as defined in the claims.

What is claimed is:

1. Apparatus for making fiber optic cables including a guide through which a strength member of circular cross-section is longitudinally advanced, the strength member having a plastic coating secured to the outside surface thereof, the plastic coating being exposed at a location adjacent to the guide, a groove cutting station, a cutter at the groove cutting station in position to cut a helical groove in the coating on the strength member, a conductor feed station beyond the groove cutting station in the direction in which the strength member has longitudinal movement, means at the conductor feed station for feeding fiber optic conductors and conductor protection material into the helical groove, a wrapping station beyond the feed station with means for applying binding material around the circumference of the plastic coating to retain the conductors and their protection material in the helical groove, and means for advancing the strength member, and the structure carried thereby, through the apparatus at a controlled speed.

2. The apparatus described in claim 1 characterized by the cutter being a rotary cutter, an axle on which the cutter rotates about an axis, a support for the guide, bearings in which the guide rotates about the longitudinal axis of the plastic coated strength member within the guide, adjustable supports for said axle and on which the cutter is adjustable with respect to the axis of rotation of the guide, a motor that rotates the cutter, a bracket supported from the guide and by which the motor is carried, and means for coordinating the speed of the guide rotation and the speed of the means for advancing the strength member and the structure carried thereby.

3. The apparatus described in claim 2 characterized by two cutters on opposite sides of the strength member for cutting helical grooves in the plastic coating on opposites sides of the strength member, and means for feeding conductors into both of the grooves at the conductor feeding station.

4. The apparatus described in claim 3 characterized by a head extending radially outward from the strength member guide and constituting an integral unit therewith, two brackets on a face of the head, a motor for each cutter, each motor having a shaft to which the cutter is secured, adjustable means for connecting the respective motors with the respective brackets for changing the motor positions with respect to the longitudinal axis of the strength member, said ajustable means including adjustments for the depth of the cut made by the cutters of the respective motors.

5. The apparatus described in claim 2 characterized by a slip ring that rotates with the guide, a circuit leading from the slip ring to the motor, and a brush that bears against the slip ring and that is connected with a stationary source of power for the motor.

6. The apparatus described in claim 1 characterized by a groove cleaning station including means for removing chips from the cutting operation from the helical groove, said cleaning station being at a location between the cutting station and the conductor feed station.

7. The apparatus described in claim 1 characterized by the conductor feed station including a guide through which the strength member passes, supporting bearings in which said guide rotates about the axis of the strength member, pay-off reels supported by axles that have orbital movement about the longitudinal axis of the strength member, the reels being in position to supply fiber optic conductors to a helical groove in the coating on the strength member, and means for rotating the guide at a speed coordinated with the rate of longitudinal movement of the strength member and the angle of lay of the helical groove to advance the conductors from the reel and into the helical groove as the strength member passes through the feed station.

8. The apparatus described in claim 7 characterized by the reels containing tapes to which the fiber optic conductors are secured, and the tapes being of a width to fit into the helical groove formed in the coating by the cutter.

9. The apparatus described in claim 1 characterized by a mechanical guide finger adjacent to the feed station and extending into the helical groove just ahead of the location at which the conductors are fed into the groove, the finger fitting snugly in the groove and having a support that rotates the finger at a speed coordinated with the speed of longitudinal advance of the strength member so as to follow the helical groove and maintain the groove in fixed orientation with respect to the feed of the fiber optic conductors into the helical groove.

10. The apparatus described in claim 1 characterized by the structure at the grooving station and at the feed station rotating around the longitudinal axis of the strength member at the same speed, and means for coordinating the speed of rotation of the structure at the grooving station and at the feeding station with the means for advancing the strength member in accordance with the desired pitch of the helical groove.

11. The apparatus described in claim 1 characterized by the wrapping station including a guide through which the strength member advances longitudinally at the same speed that it comes through the groove cutting station and the conductor feed station, a frame that rotates about the axis of the strength member, spools carried by the rotating head and having orbital movement about the strength member at the wrapping station, and power driving means for rotating the spools about their orbits in timed relation to the longitudinal movement of the strength member for applying a predetermined wrapping around the outside of the strength member and over the helical groove for holding the fiber optic conductors and their protecting structure in the groove.

12. The apparatus described in claim 1 characterized by apparatus for advancing the strength member through the groove cutting station, the cleaning station, the conductor feed station, and the wrapping station, a rotating head at the cutting station that rotates the cutters with orbital movement about the strength member; a second rotating head at the conductor feed station that rotates about the axis of the strength member and that carries reels for supplying fiber optic conductors to grooves in the coating on the strength member; and a third rotating head at the wrapping station which moves reels of wrapping material with orbital movement about the strength member as it passes through the wrapping station, the means for advancing the strength member longitudinally and for rotating the heads at the groove cutting station, the conductor feed station and the wrapping station all being driven by a common motor connected with the driven apparatus through motion transmitting means that control the mechanical advantage and maintain the relative speeds of the different parts of the apparatus with respect to one another.

13. The apparatus described in claim 1 characterized by a reel at the conductor feed station that applies tape from one payoff and another reel that applies fiber optic conductors into the same helical grooves so that the tape protects the fiber optic conductors.

14. The apparatus described in claim 13 characterized by adhesive on the tape with which the fiber optic conductors come in contact and are held in parallel relation with one another.

15. The apparatus described in claim 1 characterized by cutters for cutting a plurality of helical grooves and means for supplying fiber optic conductors in one groove and metal element conductors in another groove.

16. The apparatus described in claim 12 characterized by the motion-transmitting means including wheels, the wheels being replaceable to change the speed ratio of the strength element and the speed of the head that carries the cutters to change the lay of the helical groove.

17. The apparatus described in claim 1 characterized by guides for the strength member at each station, said guides being replaceable with other guides of different sizes for strength members of different diameter.

18. The apparatus described in claim 1 characterized by the conductor protection material for the fiber optic conductors being tapes to which the fiber optic conductors are secured, and other reels with metal conductors on the same head as the fiber optic conductors at the conductor feed station.

19. The apparatus described in claim 1 characterized by the cutter at the groove cutting station having a support of wedge-shaped cross-section and that is secured to a plate for controlling the pitch of the helical groove, detachable fastening means for holding the cutter support in one position, and other supports of different wedge-shaped cross-section from the first support for holding the cutter in position to cut a groove having a different angle of helical pitch in the coating of the strength member.

20. The apparatus described in claim 19 characterized by a groove stabilizer at the conductor feed station and that is secured to structure of the conductor feed station and that has an end portion that extends into the groove for insuring that the groove will maintain a constant orientation with respect to the feeding of the conductor into the groove, the groove stabilizer being held in place by a detachable fastening so that other groove stabilizers can be used to accommodate strength members of different diameter and helical grooves of different pitch.

21. The apparatus described in claim 1 characterized by a plurality of cutters angularly spaced around the strength member and that cut a plurality of angularly spaced helical grooves in the coating of the strength member, there being for each cutter a support of wedge-shaped cross-section and that is secured to a plate for controlling the pitch of the helical groove, detachable fastening means for holding the cutter support in position, and other supports of different wedge-shaped cross-section from the first support for holding the cutter in position to cut a groove having a different angle of helical pitch, and a groove stabilizer for each groove located at the conductor feed station and that is secured to structure at the conductor feed station and that has an end portion which extends in the groove for insuring that the groove will maintain a constant orientation with respect to the feeding of the conductor into the groove, each groove stabilizer being held in place by a detachable fastening so that other groove stabilizers can be used in place of the first stabilizer to accommodate strength members of different diameter and helical grooves at different pitch.

* * * * *